United States Patent Office 3,346,392
Patented Oct. 10, 1967

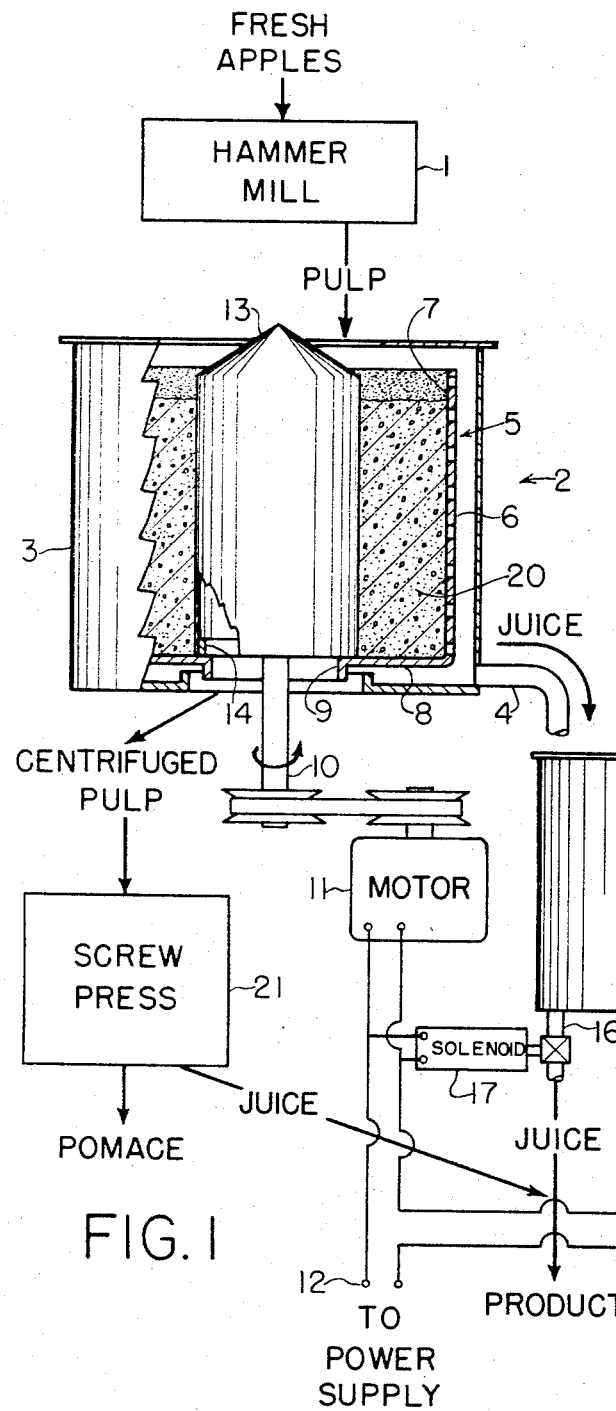
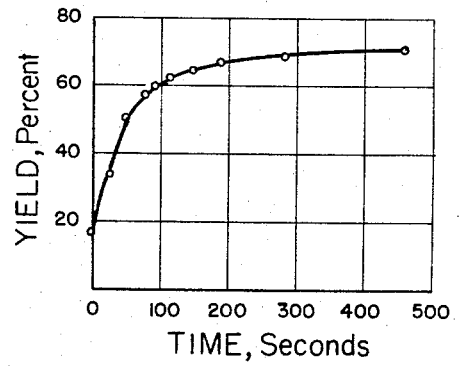

3,346,392
PRODUCTION OF FRUIT JUICES
Edison Lowe, El Cerrito, Everett L. Durkee, El Sobrante, and Walter E. Hamilton, El Cerrito, Calif., assignors to the United States of America as represented by the Secretary of Agriculture
Filed July 23, 1964, Ser. No. 384,815
8 Claims. (Cl. 99—105)

ABSTRACT OF THE DISCLOSURE

Process for extracting juices from fruit pulps which provides not only a juice low in suspended solids but also a high yield of juice. In a first stage of the process, fruit pulp is introduced into a centrifuge. The device is rotated at a slow speed to form a compacted thick cake of pulp, then the speed is increased and maintained at extraction level until about ⅗ to ¾ of the available juice is expelled from the pulp. In a second stage, the centrifuged pulp is subjected to pressing action—using, for example, a conventional screw press—to extract the remainder of the available juice. The two fractions of juice are then combined. A juice of especially low content of suspended matter is produced by filtering the press juice through the centrifuge cake remaining from the first stage of the process (the centrifugation of the pulp) and then combining this juice with that obtained in the centrigugation stage.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing fruit juices. Further objects of the invention will be evident from the following description wherein parts and percentages are by weight unless otherwise specified.

In the annexed drawing, FIGURE 1 is a schematic diagram of apparatus with which the process of the invention may be practiced. FIGURE 2 is a graph showing the relationship between the time of centrifugation of a thick cake of ground apples and the yield of extracted juice.

The invention is particularly adapted to the preparation of apple juice and its application in this area is stressed in the following description. It is to be understood, however, that the invention is not limited to this particular commodity but is applicable to the preparation of juices from fruits of all kinds as, for example, pineapples, pears, strawberries, grapes, plums, cherries, apricots, blackberries, peaches, mixtures of different fruits, etc. The invention is of special advantage where the aim is to produce a clear juice, i.e., one containing a minimum of suspended matter.

The commercial production of apple juice conventionally involves the following procedure. Fresh apples are washed and ground in a hammer mill to produce a pulp. This pulp is then pressed in a rack and cloth press to separate the juice from the residual solid material, termed "pomace." In operating the press, a series of cloths are each loaded with a quantity of pulp and the corners of the cloths folded over to form a package called a "cheese." These cheeses, each separated by a wooden rack, are placed in a hydraulic press and subjected to high pressure to express the juice through the cloths into a reservoir. The resulting juice is then pumped through a conventional device such as a filter press to remove suspended solid material. Usually, the juice, prior to filtration, is treated with pectic enzymes whereby pectin in the juice is hydrolyzed. In this way the suspending power of the pectin is vitiated and the finely-divided, insoluble particles (cloud) settle out, leaving a clear juice. After the juice has been clarified by such techniques, it is pasteurized and bottled or canned. As in any other process, the yield of juice is important and it is an obvious goal to get as much juice as possible from each pound of apples. Also critical in commercial operations is the amount of suspended material in the juice. The trade demands a clear juice and to get such it is essential that the juice extracted from ground apples contain a minimum of suspended material so that it can be clarified without undue expense. If the proportion of suspended material increases above a minimum level, the costs of clarification and the loss of juice during such clarification will render the whole operation unprofitable.

Although the procedure outlined above is widely used, it is subject to serious problems. A major item is that the rack and cloth press entails excessive labor costs because of the manual work required in loading the cloths with pulp, introducing the cheeses into the press, removing the pressed cheeses, and unloading the pomace from the cloths. Also, the pressing is not efficient in that the pomace retains a considerable portion of juice which cannot be separated therefrom. Moreover, serious problems of microbial contamination and flavor damage are involved with the rack and cloth systems. The press cloths are primarily responsible in this connection as in continued operation the interstices of the cloths become impregnated with juice and fine particles of apple tissue. These materials act as media for growth of adventitious microorganisms and also are subject to various chemical and biochemical reactions such as oxidation, fermentation, hydrolysis, enzymatic browning, etc., whereby as fresh material is processed with the cloths, the juice entrains some of this material, resulting in microbial contamination of the juice and development of off-flavors and off-odors therein.

Although the art is cognizant of these problems and various alternative pressing devices have been advocated, no practical substitute for the rack and cloth press system has been found heretofore. The difficulties involved are demonstrated by the following explanation: The pulp of ground fresh apples is inherently incapable of being pressed efficiently because of its soft and mushy texture. When the pulp is subjected to moderate pressing a very low yield of juice is obtained. If, on the other hand, a high pressure is used, the pieces of apple tissue in the pulp are crushed into fine particles which are forced through the interstices of the filter surface of the press so that the resulting juice will contain an excessive proportion of finely-divided solids and, moreover, the interstices will eventually become plugged so that the pressing operation will come to a standstill with no significant amount of juice produced. Another point to be considered is that the properties of the pulp vary markedly depending on various factors, primarily the maturity of the fruit. Generally, fruit picked early in the season will exhibit a harder texture and will provide better results than fruit picked late in the season, which yields a pulp of exceptionally soft texture. In view of these considerations, the available system and devices offer at best a compromise between (a) high yield of juice containing a large amount of suspended solids and (b) low yield of relatively clear juice. Moreover, although the disadvantages of the rack and cloth press are known and various other types of presses have been advocated, the fact remains that rack and cloth press is the only one which provides satisfactory results.

The system in accordance with the invention surmounts the problems outlined above in that it provides not only a juice low in suspended solids but also a high yield of juice. Moreover, it eliminates the conventional rack and cloth press with its attendant high labor costs, sanitation and off-flavor problems. It enables the juice extractions to be accomplished with the use of a centrifuge and a screw press—devices which provide fast and effective results with a minimum of labor costs. It may be noted at this point that although centrifuges and screw presses are old in the art and widely used in various fields, they have not been successfully applied heretofore in the production of fruit juices where clarity of the product is a criterion.

A basic principle of the present invention is that the juice is produced in two distinct stages. In the first stage the pulp is subjected to centrifugation under particular conditions to obtain only a limited proportion of juice from the pulp. Thus, this stage is limited to obtain a weight of juice about from 50 to 65% of the original weight of the pulp. Expressed in other terms, this constitutes about ⅗ to ¾ of the total available juice. By this particular mode of centrifugation not only is a substantial proportion of the juice produced but also the pulp is put into a condition in which it is more amenable to pressing. Accordingly, in the second stage of the process the centrifuged pulp is pressed in a conventional press equipped with means for exerting mechanical pressure on the pulp to provide a crushing action, typically a screw press. Because of the conditioning effect of centrifugation, this pressing operation is achieved effectively, with no problems of excessive suspended matter in the juice or plugging of the fine perforations in the press surfaces.

Reference is now made to FIG. 1 in the annexed drawing which illustrates the system in accordance with the invention. Fresh whole apples are fed into hammer mill 1 where they are ground to a pulp. As in customary practice, a small proportion of a fibrous pressing aid such as cellulose fiber may be incorporated into the pulp. In any event, the ground material is fed into the centrifuge, generally designated as 2, for the first stage of dejuicing.

Centrifuge 2 includes a shroud 3 and a conduit 4 for discharging extracted juice. Within shroud 3 is a rotatable basket 5 provided with a cylindrical wall 6 having large perforations, and an inner liner 7 having fine perforations, typically 0.02 inch in diameter. Bottom 8 of basket 5 is imperforate except for a central opening 9 for discharge of pomace. Shaft 10 secured to basket 5 is rotated by a variable speed electric motor 11. Power is fed to the motor from terminals 12. Also provided is a removable baffle 13—a cylinder of sheet metal provided with a conical top and having a gasket 14 about its lower periphery to provide a seal. The centrifuge is also equipped with the usual auxiliary devices (not illustrated) including a plow for removing pomace.

Associated with centrifuge 2 is tank 15 provided with an outlet conduit 16 and solenoid valve 17. Also provided is float 18 which cooperates with cut-off switch 19. The terminals of this switch are connected in series with one leg of the power supply to motor 11 and solenoid valve 17. With this arrangement, when float 18 rises to a predetermined level, the power to motor 11 is cut off, resulting in discontinuance of the rotation of basket 5 and at the same time solenoid valve 17 is opened to discharge the juice which has been collected in tank 15.

In carrying out the first stage of the dejuicing, centrifuge basket 5 is rotated at slow speed, i.e., just fast enough to hold the pulp out against the wall of the basket. Baffle 13 is in place as shown in the drawing, and solenoid valve 17 is closed. The pulp from hammer mill 1 is fed into basket 5 to fill the annular space between the wall 6 of the basket and baffle 13. The amount of pulp fed into the system and the dimensions of basket 5 and baffle 13 are correlated to provide a thick cake, 20, of pulp, that is, one having a thickness of at least 2 inches, preferably 3 to 6 inches. After feeding in the pulp, the slow rotation is continued for a short time longer—e.g., about 15 to 60 seconds—to lightly compact the pulp. This slow rotation of the centrifuge at the time of filling is a key item in the process of the invention which makes it possible (when the speed of rotation is later increased) to obtain a good yield of clear juice. Thus, by the slow rotation the cake is lightly compacted into a cake of good filtering properties—juice can flow through it without eroding fine particles out of the mass. On the other hand, were the pulp to be directly fed into a centrifuge operating at extraction speed, the results would be disastrous. In such case, the sudden impact of the entering pulp against the walls of the centrifuge would cause the expelled juice to carry with it a large load of fine particles. Thus, by not having a pre-formed cake the juice would contain an excessive proportion of suspended solids. However, in the process of the invention erosive action (which leads to excessive suspended matter in the juice) is prevented by forming a stable cake of pulp on the centrifuge walls through the application of slow rotation at a speed just sufficient to hold the pulp out against the walls and to lightly compact the material but not fast enough to expel any juice.

After the pulp has been lightly compacted as described above so that it is optimum condition for juice extraction, the speed of rotation of basket 5 is gradually increased to tighten up the cake and finally it is raised to regular extraction speed and held there. As the juice is expelled from the pulp, it flows into tank 15 until the juice in the tank lifts float 18, thereby actuating switch 19, cutting off rotation of basket 5 and opening solenoid valve 17 to discharge the juice which has collected in tank 15.

It is a critical item in operating the system that the float 18 is adjusted to cut off rotation of the centrifuge when only a part of the total juice available in the pulp is expelled. The cut-off point will vary depending on such factors as the variety of apples and the maturity thereof and, in general should be when a weight of juice from 50 to 65% of the weight of the pulp has been extracted. This fraction of the total juice may be termed the "readily-extractable" portion of the juice and constitutes the major portion of the total yield of juice. Thus typically, the ratio of first-stage (centrifuge) juice to second-stage (press) juice varies from 1.5 to 3 parts, preferably 2.5 to 3 parts, of first-stage juice per part of second-stage juice.

It has been found that when these limits are observed, excellent results are attained. One significant point is that a substantial portion of the total juice is extracted in a very short time in a very efficient manner, involving a minimum of labor. Another point is that the juice obtained is of particularly good quality, being exceptionally free from suspended solids. This is, of course, advantageous in that the final product (the composite of centrifuge juice and press juice) will have an acceptably low proportion of suspended solids. Since the centrifuge juice always contains a lesser proportion of suspended solids than the press juice, by having the centrifuge juice in major proportion, one is assured that the composite product will contain an acceptably low content of suspended solids. Also, with such a mode of operation, the pulp is put into a condition in which it is easily plowed out of the centrifuge—it parts readily from the centrifuge basket, leaving the latter clean and ready for the next batch. Moreover, this partly-dejuiced pulp is admirably suited for pressing, i.e., it can be effectively pressed in a subsequent stage in a device which exerts a crushing action—e.g., a screw press—to yield a second batch of juice of acceptably low content of suspended solids. A further point is that operating within the said limits takes full advantage of the intrinsic capabilities of the centrifuge. This situation is explained as follows: In operating a centrifuge with a preformed thick cake (as done herein), initially—and up to a yield of about 50%—there is a linear relationship between yield of juice and time of centrifugation. Thus for each unit of time, the amount of juice extracted in this period will be the same. This part of the centrifugation may be referred to as one wherein the time-yield ratio is constant. However, as the centrifugation continues, the rate of juice extraction falls off and when over 65% of the juice has been extracted, further increments in time yield but very minor additional quantities of juice. Accordingly, by limiting the time of centrifugation to extract only about half the available juice, the system is utilized at an efficient level; time is not consumed uselessly in trying to extract additional juice which the system is poorly qualified to deliver. This situation is further demonstrated by the following experimental data:

Ground apples containing 0.5% of cellulose fiber were fed into a centrifuge as shown in FIG. 1 (diameter of basket 5 was 16.5 inches). During loading, the centrifuge was rotated slowly. After a 4-inch thick cake had been formed, the centrifuge was gradually brought up to extraction speed—1200 r.p.m. As the extraction continued, the juice was collected at intervals and its quantity measured. The graph of time of centrifugation vs. yield of juice is shown in FIG. 2 in the annexed drawing. (It may be noted that the initial yield of 17.5% at zero time represents the liquid which drained from the pulp during the filling step and before the extraction speed had been reached.) It is evident from the curve that initially the time-yield ratio is constant and then as the process continues the rate falls off so that above about 65%, further yields of juice are obtained only by greatly extending the time of centrifugation. It is further evident from the curve that by limiting the time of extraction, as done in accordance with the invention, the centrifugal system is utilized efficiently, without needless expenditure of time in attempting to extract additional quantities of juice which the system is poorly equipped to supply.

Unexpectedly, we have also found that when the degree of juice extraction is limited as explained above, advantages are gained in areas other than in efficient utilization of the centrifuge. Thus, with this type of limited juice extraction the partly-dejuiced pulp can be removed easily from the centrifuge and, moreover, it is in optimum condition for pressing in a further stage.

On the other hand, if the above limits on juice extraction during the first stage are not observed, inferior results are obtained. For example, if the proportion of juice extracted in the first stage is substantially below 50%, these problems will be encountered: The centrifuge is not used to full capacity. The centrifuged pulp is difficult to plow out of the basket; because of its moist condition it tends to smear on the wall of the basket, clogging the perforations therein so that the system has to be shut down for cleaning. The composite juice product will be excessively high in suspended solids. This follows because in such mode of operation the ratio of centrifuge juice to press juice is decreased and since the press juice always is much higher in suspended solids, the composite juice will accordingly contain excessive suspended matter. A last point is that if the proportion of juice removed in the first stage is small, the centrifuged pulp will be so fluid that it cannot be handled in a screw press—the screw will be unable to take a purchase on the material. Moreover, if the proportion of juice extracted in the first stage substantially exceeds 65%, the following problems will be encountered: The time of centrifugation is needlessly extended in securing increments of juice which can be more effectively obtained by pressing. In other words, the press is kept idle at the very time when it could be applied effectively. Moreover, excessive time of centrifugation yields a cake which is very difficult to plow out of the basket. Fibrous particles of the fruit become keyed into the perforations of the basket and when the plow is put into operation, these fibers are sheared, leaving the keyed portions in the perforations. As a result, the system must be shut down to clean the centrifuge.

Returning now to FIG. 1 of the drawing—after completion of the first-stage extraction, as described above, the pulp is removed from basket 5. To facilitate this removal, baffle 13 is lifted out before operation of the plow is initiated. The centrifuged pulp is then fed into a conventional screw press, designated as 21 in the drawing. In this device the pulp is pressed to remove the remainder of the available juice. This fraction of the juice is combined with the first-stage juice. The resulting composite juice which forms the product of the total operation is then subjected to conventional operations such as clarification, pasteurization, bottling, etc.

In a modification of the basic system of the invention, advantage is taken of the filtering ability of the centrifuge cake to clarify the press juice. A typical technique for applying this modification is as follows: Ground apples are subjected to centrifugation and pressing in the manner as described hereinabove. The press juice is put to one side. Then, a succeeding batch of ground apples is subjected to the centrifugation as described above. The centrifuge cake is, however, not directly subjected to pressing. Instead, the cake is left in place on the centrifuge and the press juice from the preceding run is sprayed on the cake while it is being rotated at the regular extraction speed. As noted above, the cake has excellent filtration characteristics and as a result the press juice flowing through it is clarified, i.e., the proportion of finely-divided suspended material therein is markedly reduced. This filtered press juice is then admixed with the juice previously centrifuged from the ground apples, yielding the composite juice product. This procedure may be thus considered to involve three stages. In the first stage the ground fruit is subjected to the centrifugation to obtain a first fraction of juice and a partly-dejuiced pulp (or cake). In the second stage, press juice from a previous run is filtered through this partly dejuiced pulp. In the third stage the pulp is pressed to obtain a press juice (this being held for filtration following centrifugation of the next batch of ground fruit). Finally, the centrifuge juice and the filtered press juice are combined to provide the ultimate juice product. In carrying out this system it is preferred, in order to take advantage of the good filtration properties of the centrifuge cake, that the latter be used without disturbing its position on the centrifuge. Thus as explained above, the original centrifuging of the ground fruit is conducted under such conditions as to build up a thick cake of good filtration properties and, therefore, best results are achieved when this cake is utilized in such condition for the filtration. A particular advantage of this system of operation is that it provides a composite juice product having an especially low content of suspended matter.

The invention is further demonstrated by the following illustrative examples.

The tests for suspended matter in the juice were conducted by the Pectinol lees method. This involves adding 0.4 gram of pectic enzymes to 500 cc. of juice and allowing the mixture to stand at room temperature for 16½ hours. The volume of the sediment is then measured and expressed on a percentage basis. With this test, a higher percentage indicates a greater content of suspended matter.

EXAMPLE 1

(A) Red Delicious apples (early season) together with 0.5% of their weight of cellulose fiber were ground in a hammer mill provided with a screen having perforations ⅜″ in diameter.

The resulting pulp was fed into a centrifuge as shown in the drawing, wherein basket 5 was 3 ft. in diameter and 15 inches deep. In each cycle the basket, while rotating at about 100 r.p.m., was loaded with 250 lbs. of pulp, forming a cake 4 to 4½ inches thick. About 30 seconds after filling, the speed of rotation of the basket was gradually increased to 1200 r.p.m. and held at this point until the weight of juice extracted was 58% of the weight of the pulp. This took about 2 minutes.

The centrifuged pulp was then run through a conventional screw press provided with a slotted cylindrical shell and a tapered screw which fed the pulp in the direction of increasing diameter of the screw to exert progressively higher pressure on the pulp against the walls of the shell. In this operation there was produced a yield of 24% of juice (based on weight of original pulp). The two fractions of juice were composited and the proportion of suspended matter determined.

(B) As a control, a batch of the same apples (plus ½% of cellulose fiber) were ground and the juice extracted in a conventional rack and cloth press.

The results obtained in the two runs are summarized below:

| Run | Ratio of 1st-stage to 2d-stage juice | Suspended matter in juice, percent by volume | | | Overall yield of juice | |
|---|---|---|---|---|---|---|
| | | 1st-stage juice | 2d-stage juice | Composite | Percent | Gallons per ton of apples |
| A (In accordance with invention) | 2.5:1 | 6.5 | 11.0 | 8.0 | 82 | 192 |
| B (Conventional rack and cloth pressing) | | | | 9.1 | 74 | 168 |

EXAMPLE 2

The apples used in these runs were Red Delicious but were mature, late season pack. The apples were ground with 1% of their weight of cellulose fiber in a hammermill having perforations ⅜" in diameter.

(A) In this run the ground apples were centrifuged and pressed as described in Example 1, part A.

(B) In this run, the ground apples were centrifuged and pressed as described in Example 1, part A, with the exception that the press juice from each preceding batch was held to one side and, when the next succeeding batch of ground apples had been centrifuged, this press juice was filtered through the resulting centrifuge cake. The filtration was conducted by spraying the press juice on the centrifuge cake while it was rotated at extraction speed (1200 r.p.m.). This took one minute. The resulting filtered press juice was then combined with the centrifuged juice.

The results obtained in the two runs are tabulated below:

| Run | Procedure | Yield of composite juice, gal./ton of fruit | Suspended matter in composite juice, percent by vol. |
|---|---|---|---|
| A | Regular 2-stage | 184 | 9.0 |
| B | 3-stage (Recycle of press juice) | 184 | 7.6 |

Having thus described the invention, what is claimed is:

1. A process for preparing fruit juice which comprises introducing a mass of ground fruit into a perforated vessel, rotating said vessel and mass at a speed just high enough to hold the mass against the sides of the vessel and to lightly compact the mass, then increasing the speed of rotation to a level to positively expel juice from the mass and continuing rotation at this speed for a period long enough to extract a quantity of juice having a weight equal to 50 to 65% of the weight of the ground fruit.

2. A process for preparing fruit juice which comprises introducing a mass of ground fruit into a perforated vessel, rotating the vessel and mass at a speed just high enough to hold the mass against the sides of the vessel and to lightly compact the mass, then increasing the speed of rotation to positively expel juice from the mass, continuing the rotation at this speed for a period long enough to extract a quantity of juice having a weight of 50 to 65% the weight of the ground fruit, then pressing the residual ground fruit to extract a further quantity of juice and combining the two said quantities of juice.

3. The process of claim 2 wherein the fruit is apples.

4. A process for preparing apple juice which comprises introducing a mass of ground apples into a perforated vessel, rotating the vessel and the mass at a speed just high enough to hold the mass against the sides of the vessel and to lightly compact the mass, the amount of ground apples being sufficient to form a cake at least 2 inches thick, then increasing the speed of rotation to positively expel juice from the mass, continuing the rotation at this speed for a period long enough to extract a quantity of juice having a weight of 50 to 65% the weight of the ground fruit, then pressing the residual ground fruit with a crushing action to extract a further quantity of juice and combining the two said quantities of juice.

5. A process for preparing apple juice which comprises dejuicing ground apples in two separate stages, in the first stage introducing a mass of ground apples into a perforated vessel, rotating the said vessel and mass at a speed just high enough to hold the mass against the sides of the vessel and to lightly compact the mass, the amount of ground apples being sufficient to form a thick cake, then increasing the speed of rotation to positively expel juice from the mass, and continuing rotation at this speed for a period long enough to extract a first fraction of juice constituting ⅗ to ¾ of the total available juice, in the second stage pressing the resulting pulp with crushing action to extract a second fraction of juice constituting the remainder of the available juice, and combining said fractions of juice.

6. A process for preparing a fruit juice which comprises subjecting a mass of ground fruit to solely centrifugal action to extract a first fraction of juice constituting about ⅗ to ¾ of the total available juice, pressing the resulting pulp with crushing action to extract a second fraction of juice constituting the remainder of the available juice, filtering said second fraction of juice through a centrifuge cake of partly-dejuiced ground fruit while maintaining said centrifuge cake in position on the centrifuge, and combining said first fraction of juice with the filtered second fraction of juice.

7. A process for preparing apple juice which comprises subjecting each of a succession of batches of ground apples to the following steps: In a first stage, subjecting the ground apples to solely centrifugal action to extract a first fraction of juice constituting about ⅗ to ¾ of the total available juice and leaving a residue of partly-dejuiced pulp; in a second stage, spraying a press juice from a previous batch onto said partly-dejuiced pulp while applying centrifugal action and while maintaining said centrifuge cake in place on the centrifuge, and collecting the resulting filtered press juice; in a third stage, pressing the residual pulp with crushing action to extract a press juice constituting the remainder of the available juice, and cycling said press juice to a subsequent batch to provide the press juice for filtration through the partly-dejuiced pulp; and then combining said first fraction of juice and said filtered press juice.

8. In the process wherein ground fruit is first centrifuged, yielding juice and a residual centrifuge cake, and wherein the centrifuge cake is pressed with crushing action to obtain a press juice representing a further yield of juice from the fruit, the improvement which comprises filtering the press juice through a centrifuge cake remaining from the centrifugation of a batch of ground fruit while maintaining said centrifuge cake in place on the centrifuge, and combining the resulting filtered juice with the centrifuge juice.

References Cited

UNITED STATES PATENTS 2,419,545   4/1957   Gray et al. _____ 99—105

OTHER REFERENCES

Lawler, "New Juice Process Cuts Costs," Food Engineering, February 1961, pp. 71, 72.

Milleville, "Continuously Extract Juice From Fruit," Food Processing, March 1959, pp. 24, 25.

Tressler et al., "Fruit and Vegetable Juice Production," Avi Pub. Co., 1954, pp. 64–74.

HYMAN LORD, *Acting Primary Examiner.*

A. LOUIS MONACELL, *Examiner.*

M. VOET, *Assistant Examiner.*